Dec. 4, 1923.
H. J. HICK
1,476,011
SHIM PLATE FOR DEMOUNTABLE RIMS
Filed April 26, 1920
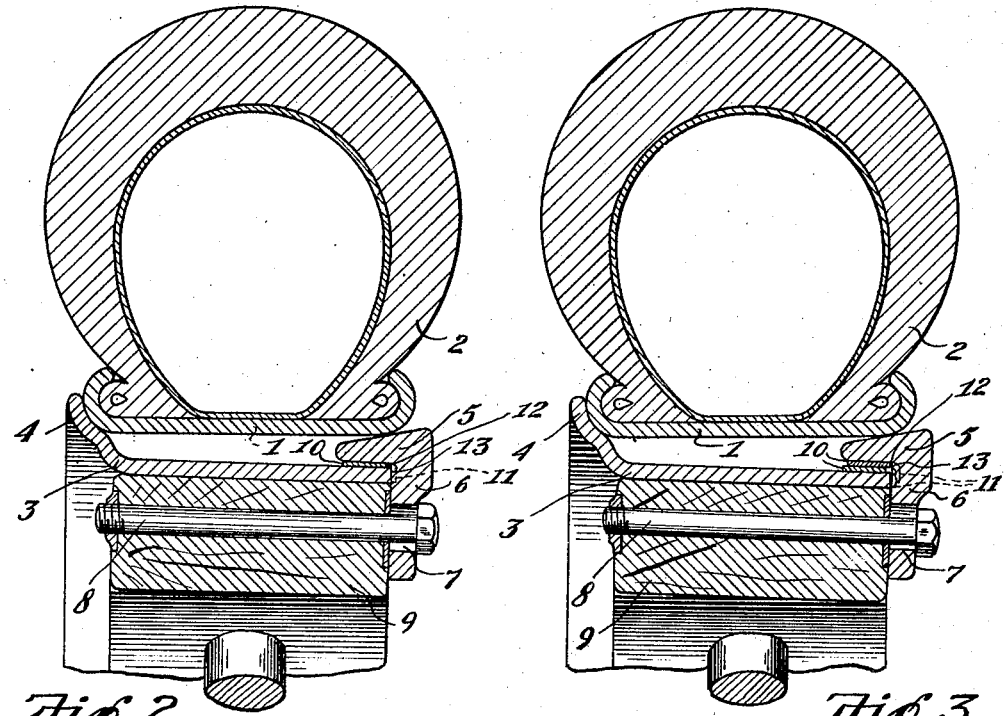
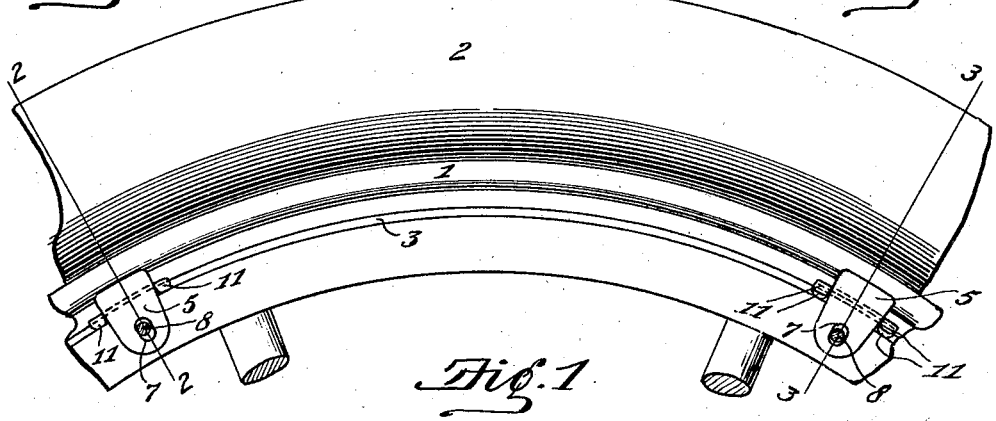
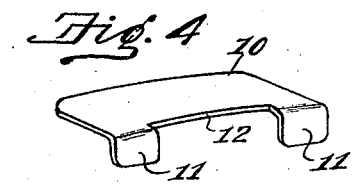
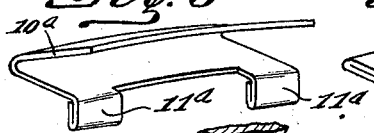
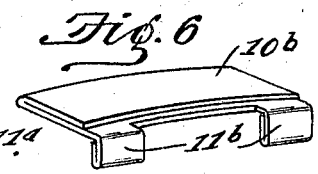
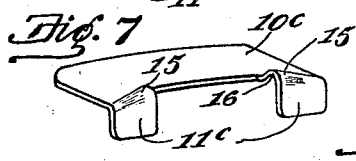
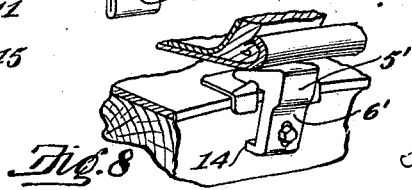
INVENTOR
H. J. Hick
Harry Frease
ATTORNEY Patented Dec. 4, 1923.

1,476,011

UNITED STATES PATENT OFFICE.

HARRY JOSEPH HICK, OF ALLIANCE, OHIO, ASSIGNOR TO THE HYKON MANUFACTURING COMPANY, OF ALLIANCE, OHIO, A CORPORATION OF OHIO.

SHIM PLATE FOR DEMOUNTABLE RIMS.

Application filed April 26, 1920. Serial No. 376,546.

*To all whom it may concern:*

Be it known that I, HARRY JOSEPH HICK, a citizen of the United States, and resident of Alliance, in the county of Stark and State of Ohio, have invented certain new and useful Improvements in Shim Plates for Demountable Rims, of which the following is a specification.

The invention relates to a shim plate for the wedge of a demountable rim for automobile wheels, and the object of the improvement is to provide a simple, standard shim plate for ready and efficient use in all the varying conditions of service.

The demountable rim of an automobile wheel is usually clamped in position thereon by means of a wedge removably mounted on the draw-bolt; and as this wedge bears upon the outer free edge of the wheel rim, there is a tendency to flatten the curve of this edge of the rim, thus rendering the wedge ineffective because of the deflection of its bearing.

Again, in the use of these devices, it has been found that the wedge becomes ineffective by reason of a stretching or deflection of the demountable rim where it is acted upon by the wedge; and also that the wedge becomes ineffective because of a wear of the wedge and adjacent parts, which may be caused by a looseness of the bolt permitting friction between the parts.

These difficulties are overcome by the use of a shim plate for the wedge so as to compensate for any deflection or wear there may be in the parts, and the present invention contemplates the use of a shim plate having L-tongues engaging the edge of the wheel rim and abutting the sides of the wedge stem.

The invention may be embodied in the forms illustrated in the accompanying drawings forming part hereof in which—

Figure 1 is a fragmentary side elevation of the rim and tire of a wheel, showing the improved shim plates in position;

Fig. 2, a cross section on line 2—2, Fig. 1, showing the use of a single shim plate;

Fig. 3, a cross section on line 3—3, Fig. 1, showing the use of two shim plates;

Fig. 4, a detached perspective view of a simple form of shim plate;

Figs. 5 and 6 are detached perspective views of modified forms of shim plates;

Fig. 7, a detached perspective view of the preferred form of shim plate for use with spaced wedges; and Fig. 8, a fragmentary perspective view showing the use of the proposed form with a spaced wedge.

Similar numerals refer to similar parts throughout the drawings.

The metal rim 1 for the rubber tire 2 is mounted around the metal rim 3 of the wheel by bearing at one side against the flange 4 of the wheel rim and on the other side against wedges 5 which are inserted between the metal rims of the tire and wheel at intervals around the periphery thereof.

The wedge is usually if not universally, provided with an L-stem 6 which is provided with an elongated eye 7 for receiving the draw-bolt 8 extending through the felly 9 of the wheel, which bolt is employed for securing and clamping the wedge for holding the tire rim firmly against its bearing on the flange 4 of the wheel rim, and at the same time wedging and properly spacing the free side of the tire rim from the adjacent side of the wheel rim.

The shim plate 10 is provided with flanges on one side edge at each end, which may be in the form of the simple L-tongues 11 as shown in Fig. 4. These flanges or tongues are arranged to engage the side edge of the wheel rim 4, while the intermediate edge portion 12 of the shim plate may abut the inner angle 13 of the wedge stem; and the flanges or tongues 11 are also adapted to abut the corresponding sides of the wedge for a short distance along the stem thereof, all as shown in Fig. 2.

By this construction and arrangement of the shim plate, it is evident that the same is securely and positively held in position when placed under the body of the wedge 5, and that it can have no independent movement upon the wheel rim other than such movement as the wedge may have thereon, such movement of the wedge on the wheel rim being usually prevented by the clamping action of the bolt 8.

And it is also evident that the stem 6 of the wedge may be drawn into contact with the rim of the wheel, so that the full effect of the thickness of the shim plate 10 is obtained when it is placed under the body portion of the wedge; which is not the case if the shim plate itself provided with a securing stem located between the rim of the wheel and the stem of the wedge.

It is also obvious that the wedge plate may be folded upward to extend over the wedge, as shown at 10$^a$ in Fig. 5, or directly upon itself to extend under the wedge, as shown at 10$^b$ in Fig. 6, for the purpose of reinforcing the thickness of the wedge by a plurality of thicknesses of the shim plate; and also that the flanges or tongues may be folded upon themselves to increase their thickness, as shown at 11$^a$ and 11$^b$ in Figs. 5 and 6; all without departing from the spirit of the invention.

In event the stem of the wedge is not drawn into contact with the edge of the wheel rim, either because the lower end of the stem 6' is provided with a rib 14, as shown for the spaced form of wedge in Fig. 8 or otherwise, it is preferred to use the form of wedge plate 10$^c$ shown in Fig. 7, wherein the bend 15 of the flange or tongue 11$^c$ is corrugated upward at its inner portion to form an extended abutment 16 for impinging the side of the body portion of the wedge 5'.

It will be understood that a plurality of wedge plates 10, as shown in Fig. 3, and in such case the edge 12 of the outer shim plate may abut the angle of the stem of the wedge, and the tongues 11 of the same shim plate lap over the tongues of the inner shim plate, thus holding all the plates against movement in any direction when the wedge is clamped into position. Furthermore, the improved form of shim can be inserted and removed from under the wedge without necessarily removing the bolt by which the wedge is held or clamped in position; it being only necessary to loosen the bolt so that the wedge may be lifted upward for entering or removing the shim from under the wedge.

I claim:—

1. A shim plate for a demountable wedge on the rim of a wheel, said shim plate having a flange on each side of the wedge for engaging the edge of the rim of the wheel and abutting the side of the wedge.

2. A shim plate for a demountable wedge on the rim of a wheel, said shim plate having an L-tongue on each side of the wedge for engaging the edge of the rim of the wheel and abutting the side of the wedge.

3. A demountable wedge for the rim of a wheel having an L-stem at the edge of the rim and a shim plate bent to reinforce the thickness of the wedge by a plurality of thicknesses of the shim and having a flange on each side of the wedge engaging the edge of the rim and abutting the side of the wedge.

HARRY JOSEPH HICK.